United States Patent [19]

Fahlen

[11] Patent Number: 4,652,963
[45] Date of Patent: Mar. 24, 1987

[54] SERIES CAPACITOR EQUIPMENT

[75] Inventor: Nils Fahlen, Västerås, Sweden

[73] Assignee: ASEA Aktiebolag, Västerås, Sweden

[21] Appl. No.: 706,428

[22] Filed: Feb. 27, 1985

[30] Foreign Application Priority Data

Mar. 7, 1984 [SE] Sweden ................................ 8401255

[51] Int. Cl.⁴ .............................................. H02H 7/16
[52] U.S. Cl. ....................................... 361/16; 361/56;
  361/58; 361/91; 361/127
[58] Field of Search ......................... 361/5, 6, 8, 9, 10,
  361/11, 15, 16, 56, 57, 58, 127, 91

[56] References Cited

U.S. PATENT DOCUMENTS

| | | | |
|---|---|---|---|
| 3,641,358 | 2/1972 | Lian et al. ................................ | 361/8 |
| 4,152,743 | 5/1979 | Comstock .................................. | 361/56 |
| 4,164,772 | 8/1979 | Hingorani .......................... | 361/16 X |
| 4,347,539 | 8/1982 | Peterson et al. ....................... | 361/16 |
| 4,432,029 | 2/1984 | Lundquist .............................. | 361/16 |

FOREIGN PATENT DOCUMENTS 1443049 7/1979 United Kingdom .

Primary Examiner—A. D. Pellinen
Assistant Examiner—Derek S. Jennings
Attorney, Agent, or Firm—Pollock, Vande Sande & Priddy

[57] ABSTRACT

A series capacitor bank for connection into an electric power supply network is provided with overvoltage protective equipment having two branches connected in parallel with the capacitor bank. The first branch comprises a first zinc oxide varistor in series with a linear resistor and the second branch comprises a varistor with a higher "knee" voltage than the first zinc oxide varistor. The resistance of the linear resistor is preferably of the same order of magnitude as the absolute value of the impedance of the capacitor bank at the operating frequency of the power supply network. The "knee" voltage of the second varistor is at least 1.15 times (and preferably not more than 2.0 times) the "knee" voltage of the first varistor.

15 Claims, 3 Drawing Figures

4,652,963

SERIES CAPACITOR EQUIPMENT

TECHNICAL FIELD

The present invention relates to series capacitor equipment comprising a capacitor bank and designed for connection into an electric power supply network, a varistor coupling being connected in parallel with the capacitor bank for protection of the latter against overvoltages.

DISCUSSION OF PRIOR ART

Series capacitor equipment of the kind to which this invention relates is used in electric transmission lines of a network for increasing the stability and the transmission capability of the network. From, for example, the specification of British Pat. No. 1,443,049, it is previously known to connect a varistor (a voltage-dependent resistor) in parallel with the series capacitor bank to protect the latter against overvoltages. From the specification of U.S. Pat. No. 4,432,029 it is known to use a metal oxide varistor. In the specification of U.S. Pat. No. 4,152,743 a transient voltage suppression system is described for use in a three-phase residential or industrial power distribution network. A parallel connection of metal oxide varistors is disposed between each pair of conductors. The varistors of each parallel connection have widely different breakdown voltages, for example 120, 800, and 1900 volts. At least one of the varistors is connected in series with a "switching resistor" (a thermistor-type device), which becomes non-conducting at a certain temperature level. It would obviously not be possible to use the transient voltage protection system of U.S. Pat. No. 4,152,743 for protecting series capacitors, which are arranged in long distance transmission lines with high current levels and with typical capacitor voltages of about 10-30 kilovolts.

The specification of U.S. Pat. No. 4,347,539 describes an overvoltage protection device for a series capacitor. It has several parallel varistor branches to increase the energy absorption capability. The breakdown voltages of the varistor branches are made to be as equal as possible, that is, with a variation within about ±1%. In order to equalize the distribution of current between the varistors, each varistor is connected in series with a resistor with a positive temperature coefficient. This protection device will function in substantially the same manner as the single varistor described in British Patent Specification No. 1,443,049 mentioned above.

OBJECT OF THE INVENTION

One object of the invention is to provide equipment of the initially stated kind which, in a better way than prior art equipment, suppresses overvoltages and subsynchronous currents and thus performs better in maintaining the stability of the network in the face of network disturbances.

SUMMARY OF THE INVENTION

What constitutes the invention is series capacitor equipment for connection into an electric power supply network and comprising a capacitor bank, a varistor coupling connected in parallel with the capacitor bank for protection of the latter against overvoltages, the varistor coupling comprising two parallel branches, a first branch including a first metal oxide varistor having a first "knee" voltage in series with a first resistor and a second branch including a second varistor having a second "knee" voltage, the second "knee" voltage of the second varistor being at least 1.15 times the first "knee" voltage of the first varistor and the first resistor having a considerably lower degree of voltage dependence than the first varistor.

BRIEF DESCRIPTION OF THE DRAWINGS

The invention will now be described, by way of example, in greater detail with reference to the accompanying drawings, in which.

DESCRIPTION OF PREFERRED EMBODIMENT

Figure 1:
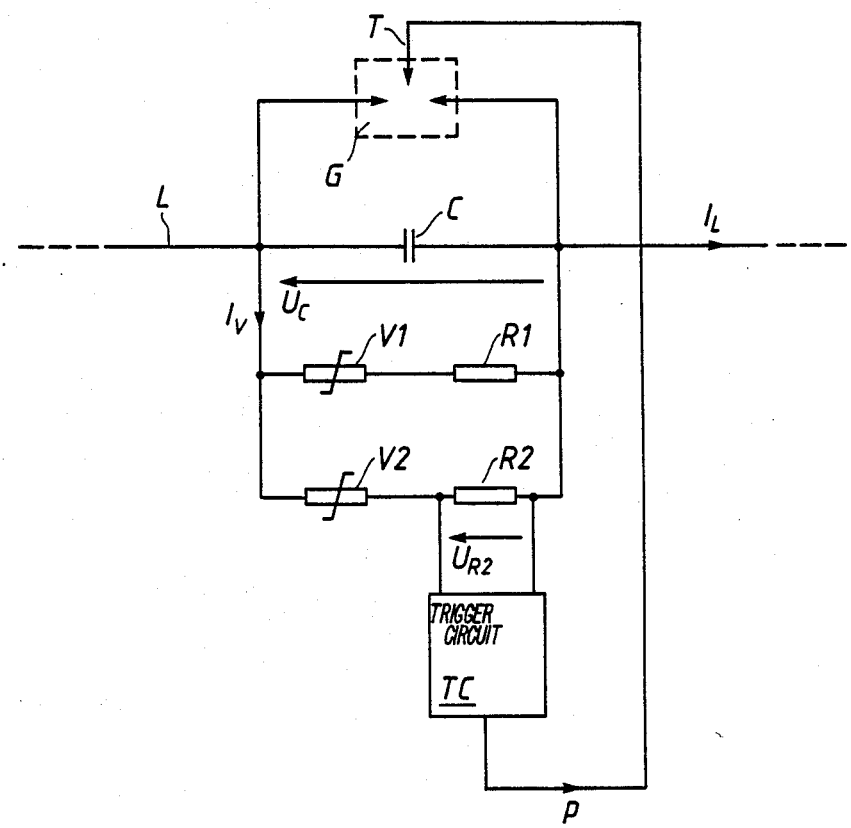
FIG. 1 shows one example of series capacitor equipment according to the invention.

FIG. 1 shows a series capacitor bank C connected into a high-voltage electric AC power line L. For simplicity, FIG. 1 only shows one of the three phase conductors of the power line. However, the other two phase conductors have similar capacitor banks and protective equipment to those shown in FIG. 1. The capacitor bank in each phase would typically be divided into several segments, whereby each segment can be provided with its own separate protective equipment. FIG. 1 thus shows how one segment with its associated protective equipment can be formed according to the invention.

In parallel with the capacitor bank C is connected a varistor coupling having two parallel branches. A first branch consists of a metal oxide varistor V1, preferably a zinc oxide varistor, in series with a first resistor R1 with preferably a linear characteristic (i.e. a voltage-independent resistance). The second branch consists of a second varistor V2, for example another zinc oxide varistor, in series with a second resistor R2.

Figure 2:
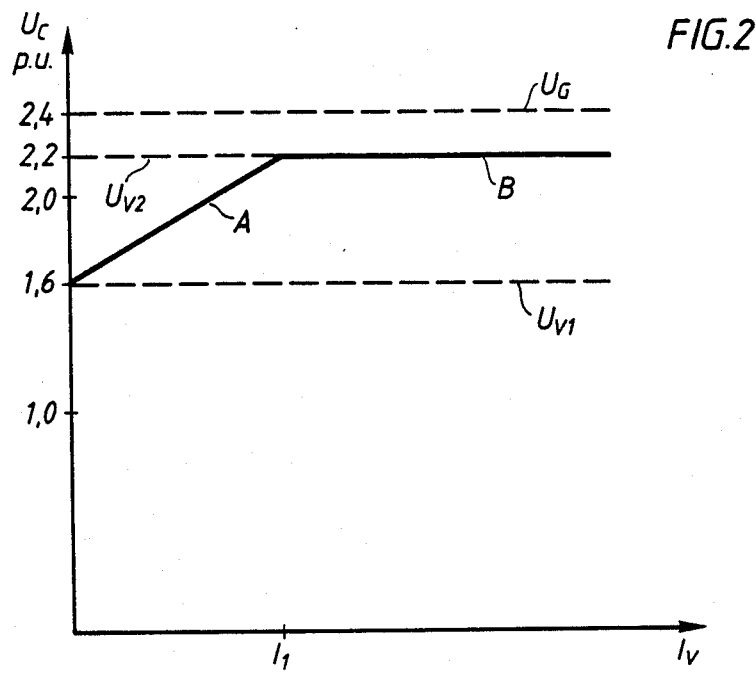
FIG. 2 shows the current-voltage characteristic of the equipment illustrated in FIG. 1.

FIG. 2 shows the current-voltage characteristic of the varistor coupling of FIG. 1. The current $I_V$ is the total current through the varistor coupling. The voltage $U_C$ is the voltage across the varistor coupling, which is the same as the voltage across the capcitor bank C. The voltage is expressed in the per-unit system, that is, $U_C = 1.0$ is the capacitor voltage during nominal operating conditions of the network, that is, when the line current $I_L$ is equal to the rated current.

A zinc oxide varistor has a current-voltage chacteristic according to the expression $$I = K \cdot U^n$$

where I is the current through the varistor, U is the voltage across the varistor and K is a constant. The exponent n has a value which may typically be between $n=25$ and $n=35$. The high value of the exponent gives the varistor a characteristic exhibiting a relatively well-defined "knee" voltage. The current through the varistor will be very low at voltages lower than the "knee" voltage. When the voltage reaches the "knee" voltage, the varistor starts carrying current with a voltage drop which is almost equal to the "knee" voltage and thereafter only increases slowly with increasing current. The current-voltage characteristic of a varistor therefore approximately consists of a horizontal line in FIG. 2.

The varistor V1 has a "knee" voltage which is 1.6 p.u. and its characteristic is represented by the horizontal dashed line designated $U_{V1}$ in FIG. 2. The varistor V2 has a "knee" voltage at 2.2 p.u. and its characteristic is represented by the horizontal dashed line designated $U_{V2}$ in FIG. 2.

The resistor R1 (which as stated previously is preferably a linear resistor) has a resistance of the same order of magnitude as the absolute value of the impedance of the capacitor bank C at the operating frequency of the network. For example, this impedance, and thereby the resistance of the resistor R1, lie within the range 10–100 ohm. The characteristc for the branch composed of the varistor V1 and the resistor R1 is thus represented by the unbroken straight line designated A in FIG. 2.

At values of the line current $I_L$ which are so low that the capacitor voltage $U_C$ is lower than 1.6 p.u., the current $I_V$ through the varistor coupling is negligibly small. At higher values of the line current, as will be clear from FIG. 2, the capacitor voltage $U_C$ is so constant that the current $I_V$ through the varistor coupling may be considered to be approximately equal to the line current $I_L$.

By means of the above-mentioned dimensioning of the varistor V1 and the resistor R1, the varistor coupling—in the event of more distant faults and in the event of faults outside the line section into which the capacitor bank is connected—will operate on the sloping part A of the characteristic shown in FIG. 2. On the appearance of such faults, the line currents will be lower than the value $I_1$ in FIG. 2. The resistor R1 is then connected in parallel with the capacitor bank C. It has been found that this will result in considerable advantages. The capacitor bank C remains effective, but with a somewhat reduced maximum voltage, and contributes effectively to maintain the stability of the network. Further, the resistor R1 provides good damping of voltage transients and subsynchronous currents and effects a considerable reduction in the maximum swing between the rotors of the machines of the network during the occurrence of a fault. Unexpectedly, it has been proved that protective equipment according to the invention, despite the reduction of the maximum value of the capacitor voltage, in total results in a substantial increase in the stability of the network compared with prior art equipment. These advantages are obtained without any significant increase in the total volume of active varistor material (ZnO) compared with that used in prior art equipment. Because the varistor V2 restricts the increase of the capacitor voltage $U_C$, the capacitor bank C may thus be dimensioned for a lower voltage than what would otherwise be possible and, in addition, a smaller and thus less expensive resistor R1 is required.

Each of the two varistors consists in a known manner of one or more stacks of resistor blocks. The necessary uniformity between the characteristics of parallel-connected blocks or stacks can be achieved by a suitable selection and combination of the resistor blocks.

The "knee" voltage $U_{V1}$ for the varistor V1 is chosen so as to exceed, with sufficient margin, the maximum capacitor voltage $U_C$ obtained during undisturbed operating conditions, suitably taking into account a certain overload. The "knee" voltage $U_{V2}$ for the varistor V2 is chosen so that it is sufficiently lower than the voltage at which there is a risk of damage occurring to the capacitor bank C.

The values given above for the "knee" voltages of the varistors are purely exemplary and other values may clearly be used without departing from the scope of this invention.

In equipment according to the invention, however, the most advantageous performance will be obtained if the relationship between the "knee" voltages $U_{V2}$ and $U_{V1}$ lies within the range 1.15 to 2.0.

In the foregoing description, the function of the protection equipment has been described for so-called external faults, that is, faults (short-circuits or ground faults) occurring outside the line section into which the capacitor equipment is connected, and it is for these types of faults that the equipment according to the invention provides considerable advantages compared with prior art equipment. In the case of internal faults located near to the protection equipment, that is, short-circuits or ground faults within the line section to which the capacitor equipment is connected, the fault currents will be high and normally greater than $I_1$ in FIG. 2. The voltage across the varistor coupling then reaches the "knee" voltage $U_{V2}$ of the varistor V2 and the voltage is limited to this value by the varistor V2. The current-voltage characteristic of the varistor coupling is then represented by the continuous horizontal line designated B in FIG. 2. In this operating case, the resistor R1 is thus shunted by the varistor V2 and the damping effect of the resistor is reduced. However, in the event of internal faults, the line section will be rapidly disconnected in the usual manner by circuit-breakers at the end points of the faulty section, and the reduction of the damping effect of the resistor therefore has no significance.

To protect the varistor V2 against overload and to protect the capacitor bank C against its voltage reaching dangerous values, a protective spark gap G (see FIG. 1) is connected in parallel with the capacitor bank C. The spark gap G has a breakdown voltage $U_G=2.4$ p.u. which, with a certain margin, exceeds the "knee" voltage of the varistor V2. The spark gap, shown schematically in FIG. 1, is provided with a trigger member T for triggering the gap at a lower voltage that $U_G$ on the appearance of a trigger signal p. The second resistor R2, which has a low resistance relative to the resistance of the resistor R1, for example 0.5 ohm, is connected in series with the varistor V2. The voltage $U_{R2}$ across the resistor R2 is a measure of the current flowing in the varistor V2 and is supplied to a trigger circuit TC which, when $U_{R2}$ exceeds a predetermined value, delivers the trigger signal p to the spark gap.

Figure 3:
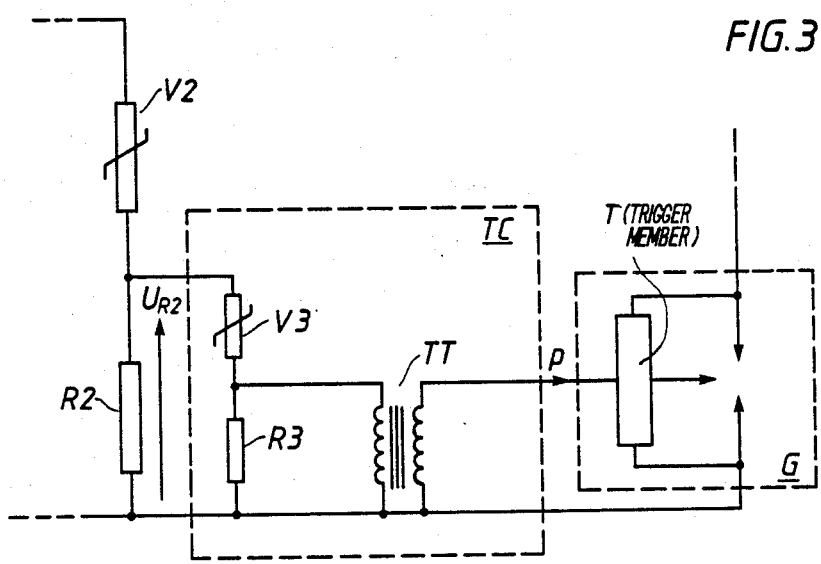
FIG. 3 shows one embodiment of trigger circuit for the spark gap of the equipment shown in FIG. 1.

The trigger circuit TC can be constructed as shown in FIG. 3. A series connection of a varistor V3 and a resistor R3 is connected in parallel with the resistor R2. The "knee" voltage of the varistor V3 is so adjusted that the varistor V3 starts carrying current at a voltage $U_{R2}$ which corresponds to the maximum permissible current of the varistor V2. A voltage is then applied across the resistor R3 and to the low voltage primary winding of a trigger transformer TT. The high voltage secondary winding of the transformer TT then emits the voltage pulse p to the trigger member T in the spark gap G, this trigger member T in its turn causing the spark gap G to fire and short-circuit the capacitor bank C. The trigger member may consist, in a manner known per se, of trigger electrodes in the main spark gaps or of separate auxiliary spark gaps which are triggered by the trigger signal p and apply such voltages to the main spark gaps that these are ignited.

The trigger circuit shown in FIG. 3 is extremely simple and, therefore, reliable and requires no separate energy supply.

To protect the spark gap G it is convenient to arrange, in a manner known per se, a by-pass circuit-breaker (not shown) in parallel with the capacitor bank C. The circuit-breaker is normally open and is activated by any convenient circuit which is capable of sensing the current through the spark gap. When the spark gap G is ignited and is traversed by current, the circuit-breaker is thereby tripped and then short-circuits the spark gap G.

The protective equipment described above with reference to the drawings is just one example in accordance with the invention and a great number of other embodiments are feasible within the scope of the following claims. For example, the varistor coupling may have more than two branches, each with a series connection of a varistor and a resistor, and with separate "knee" voltages for the varistors in the different branches.

What is claimed is:

1. Series capacitor equipment for connection into an electric power supply network, comprising:
   a capacitor bank;
   a varistor coupling connected in parallel with the capacitor bank for protection of the latter against overvoltages, the varistor coupling including first and second parallel branches:
   wherein the first branch includes a first metal oxide varistor having a first "knee" voltage in series with a first resistor; and
   wherein the second branch includes a second varistor having a second "knee" voltage;
   the second "knee" voltage of the second varistor being at least 1.15 times the first "knee" voltage of the first varistor, and
   the first resistor having a considerably lower degree of voltage dependence than the first varistor.

2. Series capacitor equipment according to claim 1, in which the first resistor is a linear resistor.

3. Series capacitor equipment according to claim 2, in which the first resistor has a resistance which is of the same order of magnitude as the absolute value of the impedance of the capacitor bank at the operating frequency of the power supply network.

4. Series capacitor equipment according to claim 1, in which the second varistor is a metal oxide varistor.

5. Series capacitor equipment according to claim 3, in which the second varistor is a metal oxide varistor.

6. Series capacitor equipment according to claim 1, further comprising:
   a protective spark gap arranged in parallel with the capacitor bank.

7. Series capacitor equipment according to claim 3, further comprising:
   a protective spark gap arranged in parallel with the capacitor bank.

8. Series capacitor equipment according to claim 4, further comprising:
   a protective spark gap arranged in parallel with the capacitor bank.

9. Series capacitor equipment according to claim 6, in which the spark gap has a breakdown voltage which is higher than the second "knee" voltage of the second varistor.

10. Series capacitor equipment according to claim 7, in which the spark gap has a breakdown voltage which is higher than the second "knee" voltage of the second varistor.

11. Series capacitor equipment according to claim 8, in which the spark gap has a breakdown voltage which is higher than the second "knee" voltage of the second varistor.

12. Series capacitor equipment according to claim 6, in which the spark gap comprises:
   a trigger circuit for triggering the spark gap in dependance on the current through the second varistor.

13. Series capacitor equipment according to claim 12, further comprising:
   a second resistor connected in series with the second varistor for generating a signal corresponding to the current through the second varistor, and
   means to supply said signal to the trigger circuit to actuate the latter.

14. Series capacitor equipment according to claim 13, in which the second resistor has a resistance which is considerably lower than the resistance of the first resistor.

15. Series capacitor equipment according to claim 1, in which the second "knee" voltage of the second varistor is not higher than 2.0 times the first "knee" voltage of the first varistor.

* * * * *